United States Patent [19]

Wise et al.

[11] 3,726,050
[45] Apr. 10, 1973

[54] FIRE PREVENTION DEVICE

[75] Inventors: Eugene H. Wise, Newhall; Alden E. Friend, Arleta, both of Calif.

[73] Assignee: R & G Sloane Manufacturing Company, Inc., Los Angeles, Calif.

[22] Filed: Dec. 11, 1970

[21] Appl. No.: 97,234

[52] U.S. Cl. ............................52/1, 52/232, 137/75, 137/360
[51] Int. Cl. ........................F16k 13/00, F16k 17/38
[58] Field of Search ..............................15/314, 315; 137/360, 361, 527.6, 72–75; 220/88 R; 52/1, 232

[56] References Cited

UNITED STATES PATENTS

| | | | |
|---|---|---|---|
| 2,461,392 | 2/1949 | Parry | 137/527.8 |
| 2,861,586 | 11/1958 | Dobbs | 137/360 |
| 3,023,447 | 3/1962 | Senne | 15/314 |
| 3,076,068 | 1/1963 | Racklyeft | 15/314 |
| 3,565,103 | 2/1971 | Maselek | 137/360 |

FOREIGN PATENTS OR APPLICATIONS 411,253   6/1934   Great Britain..........................15/314

Primary Examiner—Martin P. Schwadron
Assistant Examiner—Richard Gerard
Attorney—Tipton D. Jennings

[57] ABSTRACT

Apparatus for preventing the spread of fire in a plastic article such as a pipe section extending through a fire-resistant wall or floor is hereby disclosed. The apparatus generally includes a sleeve member which surrounds the plastic pipe extending through the wall, the sleeve being provided with a shutter device which is pivotally mounted on the sleeve and which is biased against the plastic pipe so that the shutter serves to block the passage through the sleeve member when the pipe is sufficiently softened in the presence of fire. The shutter device may be any of several configurations including a flapper valve or a rotary plate construction. Such apparatus may be installed on either or both sides of the wall or floor through which the plastic pipe section passes.

17 Claims, 6 Drawing Figures

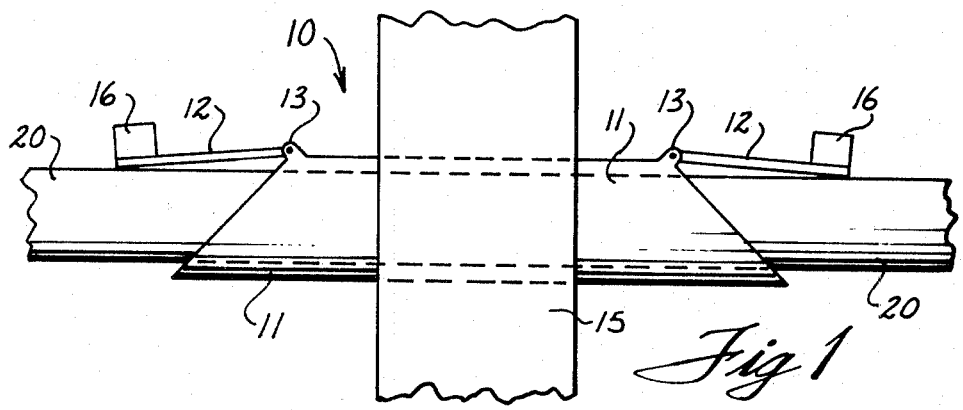
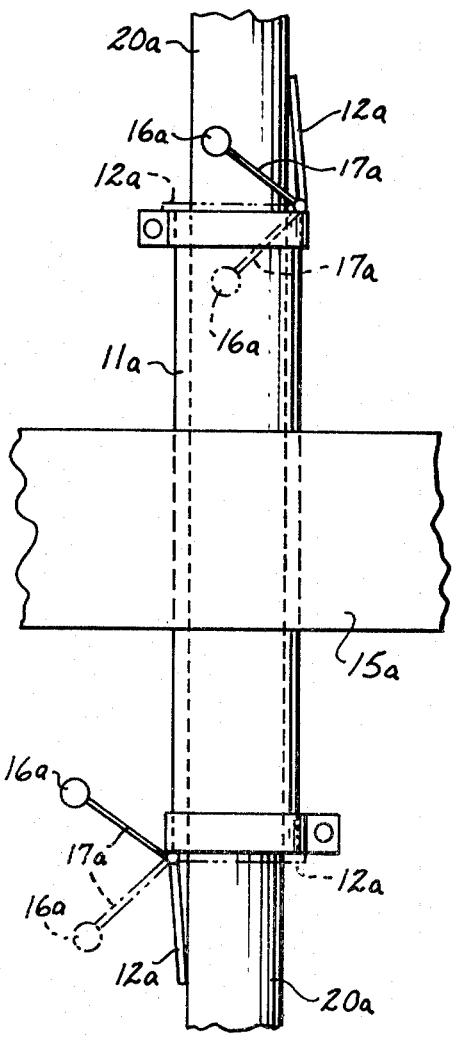
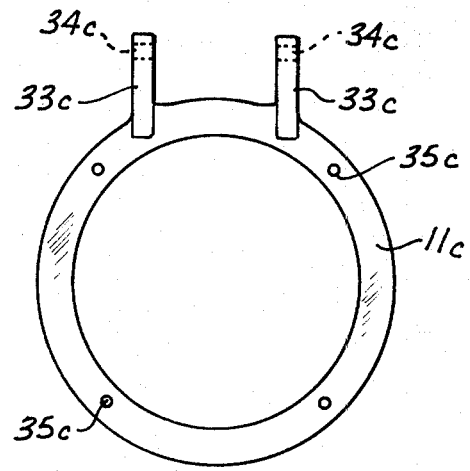
PATENTED APR 10 1973    3,726,050
SHEET 1 OF 2
Fig 1
Fig 2
Fig 6
INVENTORS
EUGENE H. WISE
ALDEN E. FRIEND
BY Martha L Rose
AGENT

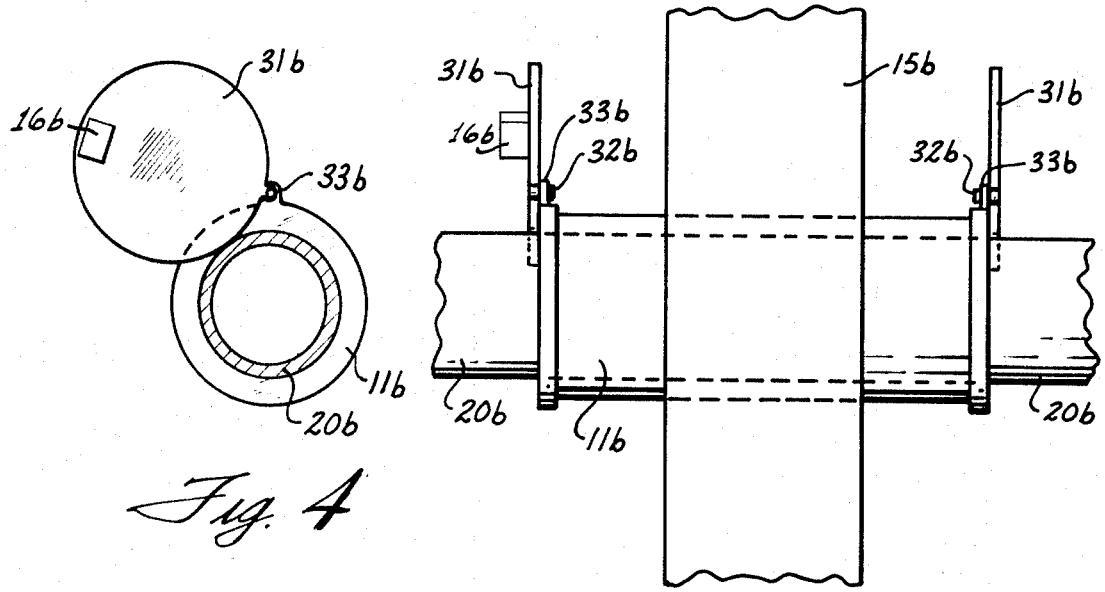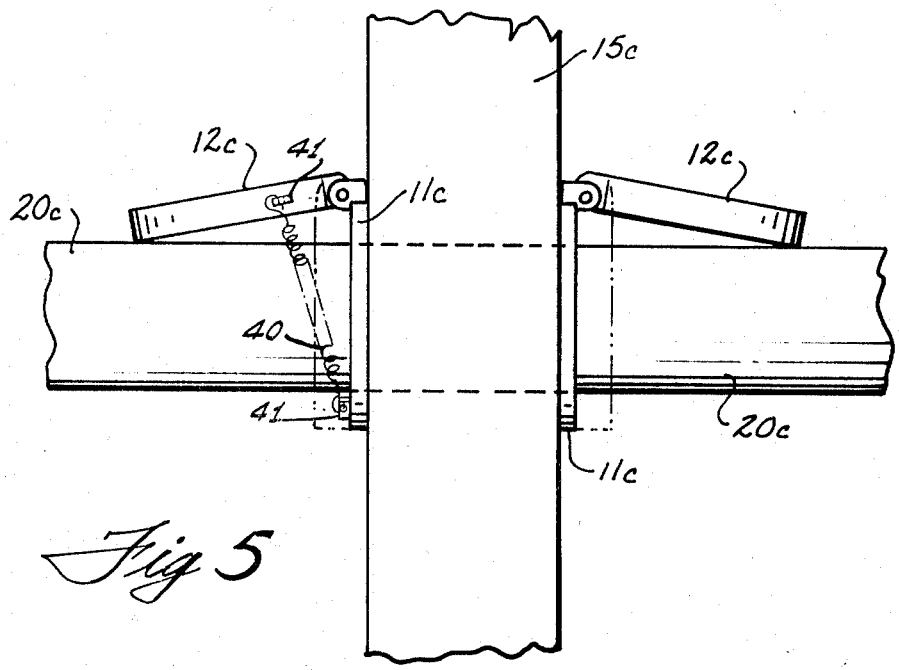

FIRE PREVENTION DEVICE

BACKGROUND OF THE INVENTION

This invention relates to a device for the prevention of the spread of fire through a passage hole in a fire-resistant wall or floor construction. More particularly, the present invention relates to apparatus provided with a shutter device which serves to block the interior passage of a plastic pipe section extending through a fire-resistant wall or floor construction, when the pipe has softened in the presence of fire, to insure against the progressive burning of the pipe system through the fire-resistant wall or floor.

One problem that has occurred recently with plastic pipe systems made of thermoplastic materials, such as polyethylene or polypropylene, has been the possibility of transmission of fire through a fire-resistant wall or floor in a building by the progressive burning of a plastic pipe system extending through the wall or floor. A few approaches have been suggested for solving this problem. One approach involves the use of plastic pipe and fittings of a self-extinguishing material, such as polyvinylchloride (PVC), that is less flammable than the polypropylene or other plastic materials sometimes used for the piping system. Pipe and fittings of PVC are used for the portion of the pipe system extending through the fire-resistant wall or floor to curb the spread of fire via the pipe system from one side of the wall or floor to the other. While this approach may be successful under some circumstances in preventing the spread of fire by the progressive burning of plastic pipe and fittings, it is unlikely to be effective in an intense fire as even the self-extinguishing plastics will burn in such a situation and will leave a hole in the wall or floor through which the fire may be transmitted. Another approach is to insulate the thermoplastic pipe system with a thick layer of high temperature insulation to prevent, thereby, the burning of the pipe system in the presence of fire. This approach, however, is very time consuming and expensive. Still another approach is described in U.S. Pat. No. 3,462,890 to Blumenkranz et al., in which an insulated gate apparatus is provided for severing the pipe section as it softens in the presence of fire and before it ignites.

By the present invention there is provided apparatus which prevents the spread of fire by the progressive burning of a plastic pipe system, by shutting off the pipe system when it softens in the presence of fire and by screening or baffling the pipe or tubing opening into the fire area. The pipe system may be shut off by the action of a flapper-like cover or, in another embodiment, the pipe system is shut off by a rotary plate.

The subject apparatus includes a sleeve member which is fitted around or into the passage hole in the wall or floor and which surrounds the plastic pipe extending through the wall. The sleeve member may extend through the wall or a sleeve may be installed on either side of the wall through which the pipe section passes. The sleeve member is provided at its outer portion with a shutter device which is biased against the plastic pipe by means of a weight, a spring or other suitable biasing means and serves to block passage through the sleeve member when the pipe is sufficiently softened in the presence of fire. In this manner the pipe system is sealed by the shutter apparatus against communication from one side of the wall or floor to the other, thereby insuring against the spread of fire from the hot side to the cold side of the wall or floor by the progressive burning of the pipe section. Drafts normally caused by open-ended burning through the plastic pipe or tubing are eliminated. When exposed to fire, the plastic pipe projecting from the sleeve member softens and melts and the shutter device which is biased against the plastic pipe closes the open end of the sleeve member. When the fire is intense, heat conducted through the sleeve member softens the plastic pipe on the cold side of the shutter device and the plastic pipe in turn sags and effectively tends to block the passage on the cold side. A shutter device can be installed on each side of the wall or floor through which the pipe section passes so that the shutter device on the cold side of the wall will also be activated if the plastic pipe adjacent to this shutter device is sufficiently softened.

REFERRING TO THE DRAWINGS

FIG. 1 is a side elevational view of apparatus constructed according to the principles of the present invention and showing weight loaded shut-off devices in operative position on each end of the sleeve member wherein the shut-off devices are adapted to close the ends of the sleeve member in the event that the walls of the plastic pipe are softened by fire;

FIG. 2 is a side elevational view of a first modification of the subject apparatus;

FIG. 3 is a side elevational view of a second modification of the subject apparatus;

FIG. 4 is a sectioned end view of the apparatus shown in FIG. 3;

FIG. 5 is a side elevational view of a third modification of the subject apparatus showing a separate sleeve located on each side of the wall; and FIG. 6 is an end view of the apparatus shown in FIG. 5.

DESCRIPTION OF THE PREFERRED EMBODIMENTS

In the illustrated embodiment of the present invention as shown in FIGS. 1 through 4, apparatus 10 is provided for preventing the spread of fire through a fire resistant wall or floor by the progressive burning of a plastic pipe system. The apparatus includes a sleeve member 11, formed of any suitable metallic or similar heat-resistant material, that is adapted to receive therethrough a pipe section 20 which forms part of a plastic piping system (not shown).

As shown in FIG. 1, a weight loaded shutter 12 is disposed above the plastic pipe 20 extending through the sleeve 11 and is attached to the upper portion of the end of the sleeve 11 for pivotal movement about the point of attachment 13. The attachment of the shutter 12 to the sleeve 11 may be by means of a pin clamp or other suitable means which provides secure attachment of the shutter 12 to the sleeve 11 while allowing the shutter 12 to pivot freely about the point of attachment 13. The shutter may be formed of steel or any other suitable metal or other heat resistant material. As shown in FIG. 1, the ends of the sleeve 11 are cut in an angle to provide a slanted surface against which the shut-off device abuts when the plastic pipe has melted. This slanted surface has been found to be advantageous in obtaining complete closure of the end of the sleeve in order to prevent the passage of fire. The end of the sleeve 11 may be cut at any suitable angle which provides complete closure of the end of the sleeve 11 when contacted by the shutter 12 including the angle which results in the end of the sleeve being perpendicular to the longitudinal axis of the sleeve 11. When the plastic pipe section 20 is subjected to fire, the pastic softens and melts so that the shutter 12 is urged by the weight 16 into sealing engagement with the end of the sleeve 11.

In operation, the sleeve 11, which is normally cylindrical in shape and preferably manufactured of sheet steel, may be rigidly mounted in any suitable manner on or within a fire-resistant wall or floor 15 to be penetrated by the section 20 of a plastic piping system. The edge of the shutter 12 rests upon the outer surface of the plastic pipe section 20 and is urged against the pipe by the weight 16 which can be a mass of cast iron or other similar material. The weight 16 can also be built into the shutter 12 by manufacturing the shutter itself of a heavy material such as cast iron. At normal ambient temperatures, the plastic pipe section is sufficiently hard to resist the pressure by the weight tending to compress the pipe.

As an illustrative example, the pipe system, including the pipe section 20, may be formed of a thermoplastic material such as polypropylene which, depending on the characteristics of the polymer used, has a softening point of approximately 350°F., a melting point of approximately 400°F., and an ignition point of approximately 800° — 850°F. In the presence of fire, therefore, polypropylene and other thermoplastic pipe will soften long before it ignites. This feature of such plastic pipe is utilized in the operation of the instant apparatus.

In FIG. 2 there is shown a modified form of the subject apparatus in which the weight 16a is attached by a rocker arm 17a to the shutter 12a with the sleeve 11a for the plastic pipe section 20a in a vertical position for passage through a floor 15a. The rocker arm may be employed in conjunction with the weight when the apparatus is used with a horizontal pipe section. An elbow-shaped sleeve can also be employed with the pipe section in a horizontal position at one end of the sleeve and in a vertical position at the other end of the sleeve. Thus a combination in which the weight is used with the rocker arm on one end of the sleeve and in which the weight is attached directly to the shutter at the other end of the sleeve is within the scope of the present invention. In the embodiment of the invention as shown in FIG. 3, a rotary plate 31b, preferably in the shape of a circular disc, is attached at each end of the sleeve 11b and is weight loaded in a downward direction so that the plate 31b rests against the upper surface of the plastic piping section 20b which passes through each end of the sleeve 11b. The plate 31b is attached to the end of the sleeve 11b by suitable means such as a pin 32b which connects the plate 31b with an extension 33b of the end of the sleeve 11b and allows the plate 31b to pivot freely about the point of attachment.

FIG. 3 shows two examples of how the shutter member or plate 31b can be weight loaded so that it is biased into engagement with pipe section 20b. The plate 31b on the left of sleeve 11b is shown as having a weight 16b which serves as the biasing means for using this plate 31b into engagement with the pipe section 20b. An end view of weight 16b is shown in FIG. 4. Weight 16b can be a mass of cast iron or similar heavy material. The plate 31b on the right of sleeve 11b can be, as discussed in the FIG. 1 embodiment, constructed of a heavy material such as cast iron, which built-in weight functions as the biasing means. Usually, however, the same type of biasing means is employed on both sides of the sleeve. An alternative example of a biasing means is a spring. When the sleeve 11b is located in a vertical position, the rotary plate 31b is preferably urged against the pipe section 20b by such a spring, so that as the pipe section softens in the presence of fire the plate 31b will be urged against the pipe section 20b and close the end of the sleeve 11b. For example, pivot pin 32b can be provided with a conventional torsion wire spring. The spring biasing means may also be employed with the shutter apparatus shown in FIG. 1 and may be employed with the pipe section located in either the horizontal or vertical position.

In FIGS. 5 and 6 there is shown an embodiment of the present invention in which a separate sleeve 11c is attached to each side of a wall or floor 15c through which the pipe section 20c passes. The apparatus is shown with a weight loaded shutter 12c attached to each sleeve 11c for pivotal movement to seal the end of the sleeve 11c when the pipe section 20c softens in the presence of fire. The rotary plate configuration previously described could be substituted for the shutter 12c. As an alternative to weight loading, the means for biasing the shutter or plate against the pipe section can be a spring or other suitable biasing means. A spring 40 is shown in FIG. 5 attached between one of the shutters 12c and sleeves 11c to illustrate how this conventional biasing means can be employed in combination in the present invention. An apertured bracket 41 is connected near the top of shutter 12c and near the bottom of sleeve 11c for attaching to the ends of spring 40, although other standard forms of attachment can obviously be employed. As mentioned previously, the spring feature illustrated here can also be used in other embodiments of the invention, including those depicted in the preceding FIGURES. In FIG. 6, there is shown an end view of the sleeve 11c of FIG. 5 with extensions 33c provided for attachment of the shutter (not shown) by means of pins passing through holes 34c for pivotal movement of the shutter against the pipe section (not shown). Holes 35c are provided for attachment of the sleeve 11c to the wall or floor through which the pipe section passes.

In the various embodiments shown in FIGS. 1 through 4, the sleeve, together with the closed shutter (including the rotary plate configuration) on each end of the sleeve, forms a closed space which acts as a heat insulating medium to prevent the spread of fire or heat through the wall or floor. In operation, if a fire occurs on one side of a fire-resistant wall or floor within which the apparatus is installed, the portion of the pipe section exposed to the fire begins to soften when the ambient temperature reaches approxmately the softening point of the plastic or at approximately 350°F. in the case of polypropylene. As the pipe section softens, the pressure exerted by the biasing means on the shutter causes the edge of the shutter to impinge upon the walls of the pipe section. When the pipe section softens sufficiently in the presence of fire, the pressure exerted upon the outer walls of the pipe section by the shutter is sufficient to close the opening in the sleeve at a point adjacent to the edge of the shutter through the pivotal movement of the shutter about the point of attachment of the shutter to the sleeve assembly. If the fire is intense, heat will be conducted from the hot side through the plastic pipe to the cold side of the wall or floor, thus softening the section of pipe immediately adjacent the installation of the apparatus on the cold side of the wall or floor. The pressure of the biasing means upon the shutter on the cold side of the wall or floor will cause the shutter to compress the walls of the pipe section and close the opening in the sleeve on the cold side of the wall as a further aid in preventing the transfer of fire through the plastic pipe system.

The apparatus as shown in FIGS. 5 and 6 includes a separate sleeve on each side of the wall or floor through which the pipe section passes. In this configuration, the shutter on the cold side of the wall will also be activated if the fire is intense, as a further aid in preventing the passage of fire through the pipe system.

From the foregoing description, it is apparent that the subject apparatus may be used to prevent the progressive burning of any appropriate type of article or assembly, other than a pipe system, formed of a thermoplastic material. While various embodiments of the subject invention are shown with the shutter mechanism on both sides of the wall or floor through which the pipe section passes, it is also within the scope of the present invention to install the shutter mechansim on only one side of the wall or floor to prevent the passage of fire through the wall or floor from that side on which the shutter mechanism has been installed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

It is claimed:

1. Apparatus for preventing the spread of fire through a passage in a wall or floor comprising:
   a. a sleeve member located at the intersection of the passage with the wall or floor, said sleeve member having an opening therethrough in alignment with said passage for receiving a thermoplastic pipe section,
   b. a thermoplastic pipe section extending through said opening of said sleeve member,
   c. a first shutter member pivotally mounted on the sleeve member externally of said wall or floor, and
   d. means for biasing said first shutter member into engagement with the pipe section to enable said shutter member to close the end of the sleeve member when the pipe section softens in the presence of fire.

2. The apparatus of claim 1 wherein the sleeve member extends through the passage of the wall or floor and both ends of the sleeve member project beyond the wall or floor, and further comprising:

a. a second shutter member pivotally mounted on the sleeve member externally of said wall or floor opposite that of said first shutter member, and
   b. means for biasing said second shutter member into engagement with the pipe section to enable said shutter member to close the end of the sleeve member when the pipe section softens in the presence of fire.

3. The apparatus of claim 2 wherein at least one shutter member is mounted so as to pivot in a plane which is perpendicular to the wall or floor through which the pipe section passes and wherein at least one of said biasing means comprises the weight of the respective shutter member acting on the pipe section under the force of gravity.

4. The apparatus of claim 2 wherein at least one shutter member is mounted so as to pivot in a plane which is parallel to the wall or floor through which the pipe section passes and wherein at least one of said biasing means comprises the weight of the respective shutter member acting on the pipe section under the force of gravity.

5. The apparatus of claim 2 wherein at least one shutter member is mounted so as to pivot in a plane which is perpendicular to the wall or floor through which the pipe section passes and wherein at least one of said biasing means comprises a weight connected to the respective shutter member and urging it into engagement with said pipe section.

6. The apparatus of claim 2 wherein at least one shutter member is mounted so as to pivot in a plane which is parallel to the wall or floor through which the pipe section passes and wherein at least one of said biasing means comprises a weight connected to the respective shutter member and urging it into engagement with said pipe section.

7. The apparatus of claim 2 wherein at least one shutter member is mounted so as to pivot in a plane which is perpendicular to the wall or floor through which the pipe section passes and wherein at least one of said biasing means comprises a spring connected to the respective shutter member and urging it into engagement with said pipe section.

8. The apparatus of claim 2 wherein at least one shutter member is mounted so as to pivot in a plane which is parallel to the wall or floor through which the pipe section passes and wherein at least one of said biasing means comprises a spring connected to the respective shutter member and urging it into engagement with said pipe section.

9. The apparatus as claimed in claim 2 wherein said sleeve member is formed with a slanted surface on both ends to aid in closing both ends of the sleeve member in the presence of fire.

10. The apparatus of claim 1 wherein the first shutter member is mounted so as to pivot in a plane which is perpendicular to the wall or floor through which the pipe section passes.

11. The apparatus as claimed in claim 10 wherein said sleeve member is formed with a slanted end surface to aid in closing the end of the sleeve member in the presence of fire.

12. The apparatus of claim 1 wherein the first shutter member is mounted so as to pivot in a plane which is parallel to the wall or floor through which the pipe section passes.

13. The apparatus of claim 1 wherein said biasing means comprises the weight of said first shutter member acting on said pipe section under the force of gravity.

14. The apparatus of claim 1 wherein said biasing means comprises a weight connected to said first shutter member and urging it into engagement with said pipe section.

15. The apparatus of claim 14 further comprising: (a) a rocker arm connected to said shutter member, and (b) wherein the weight is connected to the rocker arm and thereby said first shutter member.

16. The apparatus of claim 1 wherein said biasing means comprises a spring connected to said first shutter member and urging it into engagement with said pipe section.

17. The apparatus as claimed in claim 1 wherein said sleeve member is formed with a slanted end surface to aid in closing the end of the sleeve member in the presence of fire.

* * * * *